Patented Nov. 20, 1928.

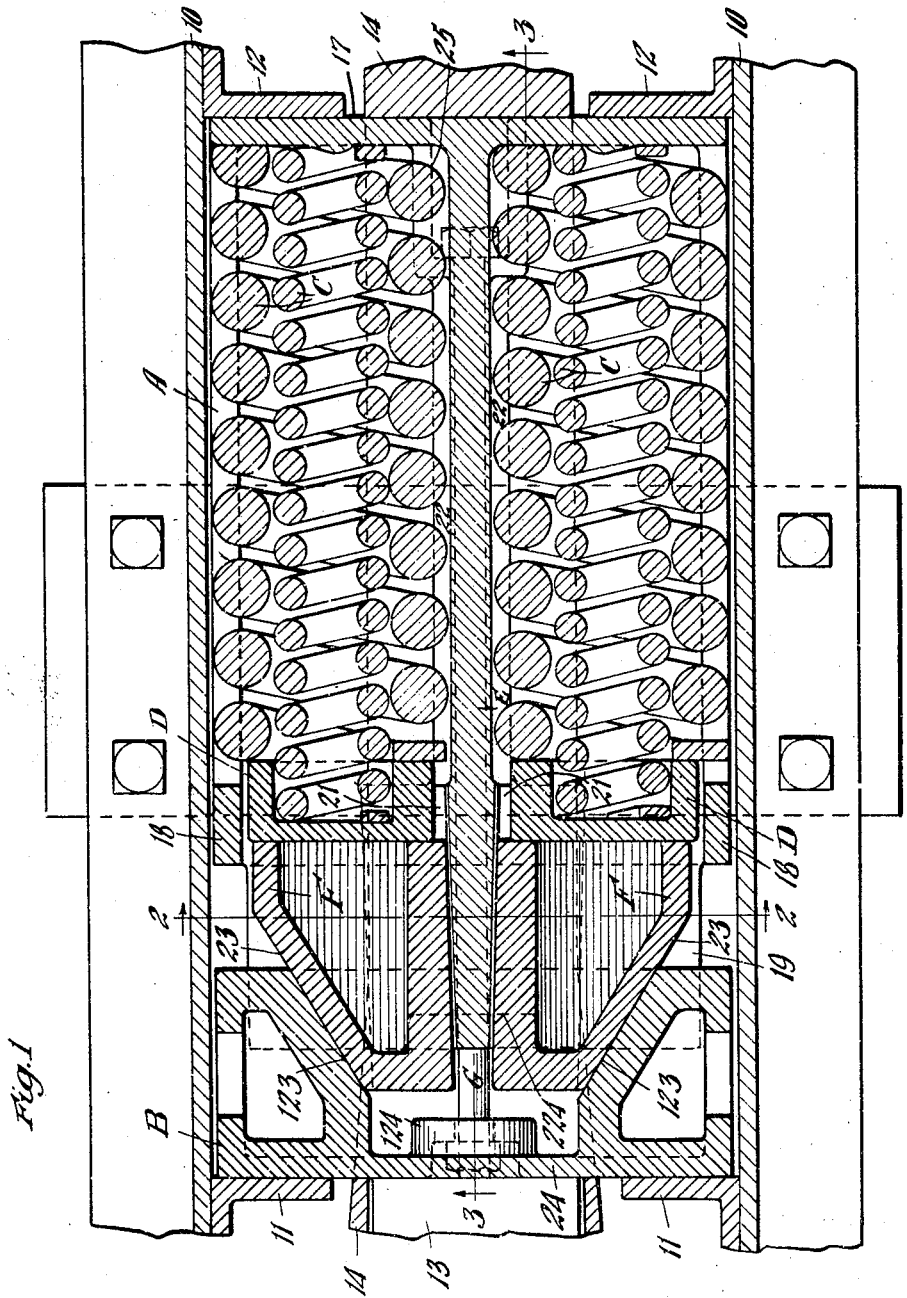

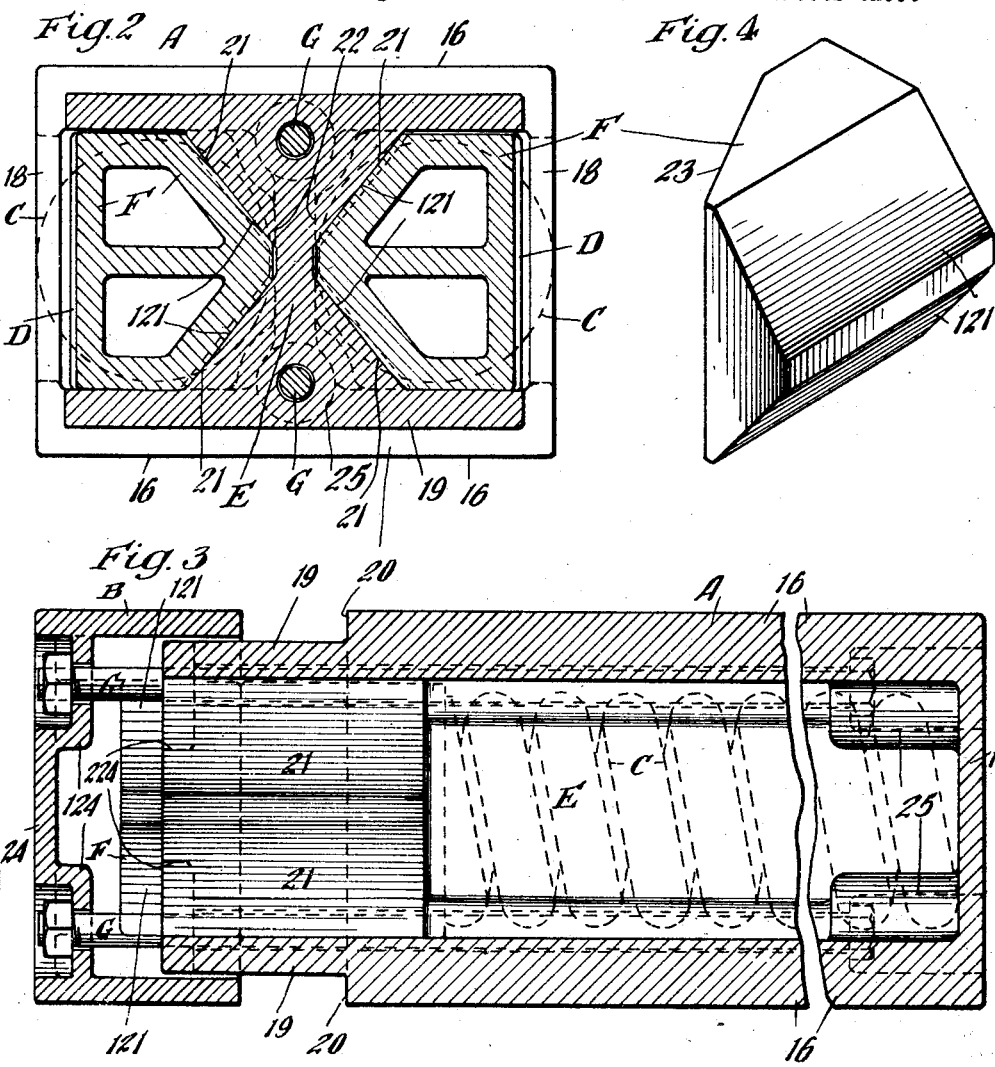

1,692,687

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed March 11, 1925, Serial No. 14 591. Renewed April 23, 1928.

This invention relates to improvements in friction shock absorbing mechanisms.

One object of the invention is to provide a friction shock absorbing mechanism of high capacity, efficient operation, long life and easy, graduated action, the shock absorbing mechanism being especially adapted for railway draft riggings and designed to provide exceptionally large spring space.

Another object of the invention is to provide a friction shock absorbing mechanism of the character indicated, comprising a spring cage having a friction post or stem, wedge friction elements cooperating with the post, a wedge casing, the casing and spring cage being arranged to telescope to house and protect the parts of the mechanism.

Other objects and advantages of the invention will more fully and clearly appear from the description and claims hereinafter following.

In the drawings forming a part of this specification, Figure 1 is a longitudinal, horizontal, sectional view of a portion of a railway draft rigging, showing my improvements in connection therewith. Figure 2 is a vertical, transverse, sectional view corresponding substantially to the line 2—2 of Figure 1. Figure 3 is a longitudinal, vertical, sectional view corresponding substantially to the line 3—3 of Figure 1. And Figure 4 is a detailed, perspective view of a friction wedge shoe used in connection with my improved mechanism.

In said drawings, 10—10 indicate channel-shaped center or draft sills to the inner faces of which are secured front stop lugs 11—11 and rear stop lugs 12—12. The inner end portion of the drawbar is indicated by 13, to which is operatively connected a hooded yoke 14 of well-known form. The shock absorbing mechanism proper is disposed within the hooded yoke, the latter and the parts therewithin being operatively supported by a detachable saddle plate 15.

The improved shock absorbing mechanism proper, as shown, comprises, broadly, a heavy spring cage or casing A; a front follower casing B; twin arranged main springs C—C; spring followers D—D; a central friction post or stem E; a pair of friction shoes F—F; and a pair of retainer bolts G—G.

The spring cage A is in the form of a heavy casting having top and bottom walls 16—16, a transverse end wall 17 and relatively short side walls 18—18, at the forward end thereof. The end wall 17 cooperates with the stop lugs 12 in the manner of the usual rear follower. The spring cage is left open at the opposite sides to permit insertion of the main spring resistance elements C. As clearly shown in Figures 1 and 3, the top and bottom walls 16 extend forwardly beyond the side walls of the cage, and are cut away at the top and bottom, as indicated at 19, thereby providing transverse stop shoulders 20 alined with the outer ends of the side walls.

The post E is located centrally of the cage A, being in the form of a vertical partition wall dividing the cage into two spring compartments. The post is coextensive with the top and bottom walls of the casing and has a pair of opposed V-shaped friction surfaces 21 formed at the outer or forward end thereof. The friction surfaces 21 of the post preferably diverge slightly outwardly of the mechanism. Rearwardly of the friction surfaces, the post is cut away at opposite sides to form pockets 22 to accommodate the sides of the corresponding spring resistance elements C.

The friction shoes F are of like construction, being two in number and disposed on opposite sides of the post. Each shoe has a longitudinally disposed V-shaped friction surface 121 on the inner side thereof, adapted to cooperate with the corresponding friction surfaces 21 of the post. Each shoe is also provided with an outer wedge face 23.

The front follower casing B is in the form of a rectangular hollow casting having a transverse end wall 24 cooperating with the front stop lugs 11 in the manner of the usual front follower. The casing B is provided with a pair of opposed, interior rearwardly diverging wedge faces 123—123 adapted to cooperate with the wedge faces 23 of the shoes E.

The twin arranged main springs are disposed in the compartments at the opposite sides of the post E, each element thereof comprising a heavy outer coil and a relatively light inner coil having their opposite ends bearing respectively on the rear wall 17 of the spring cage and the corresponding spring follower D.

The spring followers D are of like construction, each being in the form of a cap having the outer end thereof bearing on the inner end of the corresponding friction shoe F and having the inner coil of the corresponding spring element seated therein.

The mechanism is held of overall uniform length and in assembled relation by the retainer bolts G. The retainer bolts G are preferably two in number, being disposed at the top and bottom of the mechanism. Each bolt has the outer end thereof anchored to the front follower casing B, the corresponding portion of the front wall 24 thereof being inwardly offset, as shown at 124, to provide a seat for the head of the bolt. The front end of the post E is correspondingly cut away, as shown at 224, for clearance. The shanks of the bolts extend through longitudinal bores at the top and bottom of the friction post and the heads of the bolts are slidingly accommodated within enlarged portions 25 of the bores at the rear end of the post.

As clearly shown in Figures 1 and 3, the front follower casing B telescopically receives the reduced end portions 19 of the top and bottom walls of the spring cage A.

The normal position of the parts is that shown in Figures 1 and 3. As shown in these figures, the outer end of the post E and the shoulders 20 of the spring cage are spaced respectively from the front wall 24 and the inner end of the front follower casing B a distance equal to the permissible compression stroke of the mechanism, the arrangement being such that when the mechanism is fully compressed, the inner end of the front follower casing will abut the shoulders 20 and the inner face of the wall 24 will abut the front end of the post E, the post and spring cage together functioning as a column element to transmit the actuating force and thereby prevent the springs from being driven solid.

In the operation of my improved mechanism, assuming a buffing movement of the drawbar, the front follower casing will be carried inwardly, wedging the friction shoes against the friction surfaces of the post and carrying the shoes inwardly thereof. During this action, the shoes will be moved inwardly more rapidly than the front follower casing due to the diverging relation of the friction surfaces of the post, thereby effecting an additional compression of the main spring resistance elements. This action will continue until relative movement of the front follower casing and spring cage are limited by engagement of the casing with the cage and the front end of the post as hereinbefore described. During draft, the action will be substantially the reverse of that hereinbefore described, the front follower casing being held stationary and the spring cage being moved relatively thereto.

From the preceding description taken in connection with the drawings, it will be evident that the telescoping arrangement of the front follower casing and spring cage effectively houses and protects the parts; the final load on the post and cage is well distributed; and the use of springs of exceptional length and capacity is permitted.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a spring cage having top and bottom walls; of a central, longitudinally disposed partition dividing the cage into spring compartments, said partition having V-arranged friction surfaces at the forward end thereof, the top and bottom walls of said cage being co-extensive in length with the partition and being formed integral with the latter to reinforce the same; a main spring resistance element in each spring compartment; friction-shoes having wedge faces and V-arranged friction surfaces co-operating with the friction surfaces of the partition; and a hollow wedge element having interior wedge faces.

2. In a friction shock absorbing mechanism, the combination with a spring cage having a central, longitudinally disposed partition therein dividing the cage into spring compartments, said partition having a pair of rearwardly diverging, V-shaped, flat friction surfaces at the forward end and concave spring receiving seats rearwardly thereof; of a main spring resistance element in each spring compartment, each of said spring elements substantially filling said compartment and fitting the corresponding seat of the partition; a pair of friction-shoes co-operating with the friction surfaces of the post; and wedge-pressure transmitting means co-operating with the friction-shoes.

3. In a friction shock absorbing mechanism, the combination with a spring cage carrying a friction post having friction surfaces on the opposite sides thereof, said post having top and bottom wall sections formed integral with the corresponding walls of the cage; a front follower casing having interior wedge faces and telescopically receiving the post and top and bottom wall sections thereof; a pair of friction-wedge-shoes co-operating with the friction post, said shoes being disposed within the lateral limits of said wall sections; and main spring resistance elements opposing inward movement of the shoes.

4. In a friction shock absorbing mechanism, the combination with a spring cage having forwardly extending top and bottom walls and a friction post co-extensive with said top and bottom walls and formed integral therewith, said top and bottom walls extending laterally beyond said post; a front follower casing telescopically receiving the top and bottom walls of said cage; friction wedge-shoes co-operating with the friction post; and twin arranged main spring resistance elements within said spring cage.

5. In a friction shock absorbing mechanism, the combination with a spring cage having a central, longitudinally disposed partition dividing the cage into two spring compartments, said partition extending outwardly of the cage, said outwardly extending portion of the partition forming a friction post section having a pair of V-arranged, rearwardly diverging friction surfaces at the forward end thereof and curved spring pockets rearwardly of the friction surfaces, said post having top and bottom horizontally disposed lateral reinforcing flanges formed integral with the top and bottom walls of the cage; of friction-wedge-shoes co-operating with the friction surfaces of the partition; wedge-pressure-transmitting means co-operating with the shoes; and spring resistance elements within the spring compartments of the spring cage.

In witness that I claim the foregoing I have hereunto subscribed my name this 7th day of March, 1925.

JOHN F. O'CONNOR.